US012467901B2

United States Patent
Mitsushima et al.

(10) Patent No.: US 12,467,901 B2
(45) Date of Patent: Nov. 11, 2025

(54) ACCELERATED EVALUATION METHOD FOR ANODE

(71) Applicants: DE NORA PERMELEC LTD, Fujisawa (JP); NATIONAL UNIVERSITY CORPORATION YOKOHAMA NATIONAL UNIVERSITY, Yokohama (JP)

(72) Inventors: Shigenori Mitsushima, Yokohama (JP); Yoshiyuki Kuroda, Yokohama (JP); Kensaku Nagasawa, Yokohama (JP); Ashraf Abdelhaleem, Yokohama (JP); Awaludin Zaenal, Fujisawa (JP); Yoshinori Nishiki, Fujisawa (JP)

(73) Assignees: NATIONAL UNIVERSITY CORPORATION YOKOHAMA NATIONAL UNIVERSITY, Yokohama (JP); DE NORA PERMELEC LTD, Fujisawa (JP)

( * ) Notice: Subject to any disclaimer, the term of this patent is extended or adjusted under 35 U.S.C. 154(b) by 238 days.

(21) Appl. No.: 18/253,458

(22) PCT Filed: Nov. 17, 2021

(86) PCT No.: PCT/JP2021/042309
§ 371 (c)(1),
(2) Date: May 18, 2023

(87) PCT Pub. No.: WO2022/107828
PCT Pub. Date: May 27, 2022

(65) Prior Publication Data
US 2023/0408444 A1    Dec. 21, 2023

(30) Foreign Application Priority Data

Nov. 20, 2020  (JP) .................... 2020-193246

(51) Int. Cl.
G01N 27/48   (2006.01)
C25B 1/04    (2021.01)

(52) U.S. Cl.
CPC ............... *G01N 27/48* (2013.01); *C25B 1/04* (2013.01)

(58) Field of Classification Search
CPC .................................. G01N 27/48; C25B 1/04
See application file for complete search history.

(56) References Cited

U.S. PATENT DOCUMENTS 2,928,783 A   3/1960  Bacon
4,498,962 A   2/1985  Oda et al.
(Continued)

FOREIGN PATENT DOCUMENTS

GB         864457     4/1961
JP    2010186704 A  *  8/2010
(Continued)

OTHER PUBLICATIONS

Weiβ et al., Impact of Intermittent Operation on Lifetime and Performance of a PEM Water Electrolyzer, Journal of The Electrochemical Society, vol. 166, No. 8, pp. F487-F497 (2019) (Year: 2019).*

(Continued)

*Primary Examiner* — James Lin
*Assistant Examiner* — Vivian A Tran
(74) *Attorney, Agent, or Firm* — HSML P.C.

(57) ABSTRACT

The present invention provides an accelerated evaluation method for an anode, the method imitating electric power having a large output fluctuation, such as renewable energy, and enabling an accurate evaluation, in a shorter time, of durability of an anode using such electric power having a large output fluctuation as a power source. The method is an accelerated evaluation method for an anode, the method
(Continued)

Unit cycle of the ADT protocol, open circuit included performing evaluation of the durability of the anode in an accelerated manner by electrochemical operation in an aqueous electrolyte. The method includes a $J_e$ step of loading an oxidation current of 0.1 A/cm² or more to the anode for a duration of $T_e$ and an $E_{min}$ step of holding the anode at a constant potential lower than an open circuit potential for a duration of $T_{min}$, wherein each of the $J_e$ step and the $E_{min}$ step is repeated 100 times or more.

6 Claims, 7 Drawing Sheets

(56) References Cited

U.S. PATENT DOCUMENTS

| | | |
|---|---|---|
| 2002/0148736 A1 | 10/2002 | Zolotarsky et al. |
| 2016/0199821 A1 | 7/2016 | Yoo et al. |
| 2016/0237578 A1 | 8/2016 | Ichikawa et al. |
| 2020/0407858 A1 | 12/2020 | Sano et al. |

FOREIGN PATENT DOCUMENTS

| | | |
|---|---|---|
| JP | 2015-086420 | 5/2015 |
| JP | 2017-190476 | 10/2017 |
| JP | 2019-157273 | 9/2019 |

OTHER PUBLICATIONS

International Search Report, issued in the related PCT application No. PCT/JP2021/042309, dated Jan. 11, 2022, with English translation, 5 pages.

Delgado et al., "Accelerated durability test for high surface area oxyhydroxide nickel (NiOx) supported on Raney Nickel as catalyst for the alkaline oxygen evolution reaction", Chem. Phys. Chem., 2, Jun. 2019, pp. 3147-3153.

Tsukada et al., "Measurement of powdery oxygen evolution reaction catalyst under practical current density using pressure-bonded electrodes", Electrochimica Acta, vol. 353, 136544, 2020, 10 pages.

Dobo et al., "Impact of the current fluctuation on the efficiency of Alkaline Water Electrolysis", Int. J. Hydrogen Energy, vol. 42, 2017, pp. 5649-5656.

Bernt et al., "Current Challenges in Catalyst Development for PEM Water Electrolyzers", Chemie Ing. Tech., vol. 92, 2020, pp. 31-39.

Weis et al., "Impact of Intermittent Operation on Lifetime and Performance of a PEM Water Electrolyzer", Journal of The Electrochemical Society, vol. 166 (8), 2019, pp. F487-F497.

Abdel Haleem et al., "A New Accelerated Durability Test Protocol for Water Oxidation Electrocatalysts of Renewable Energy Powered Alkaline Water Electrolyzers" Electrochemistry, vol. 89 (2), Jan. 2021, pp. 186-191.

\* cited by examiner

[FIG.1]
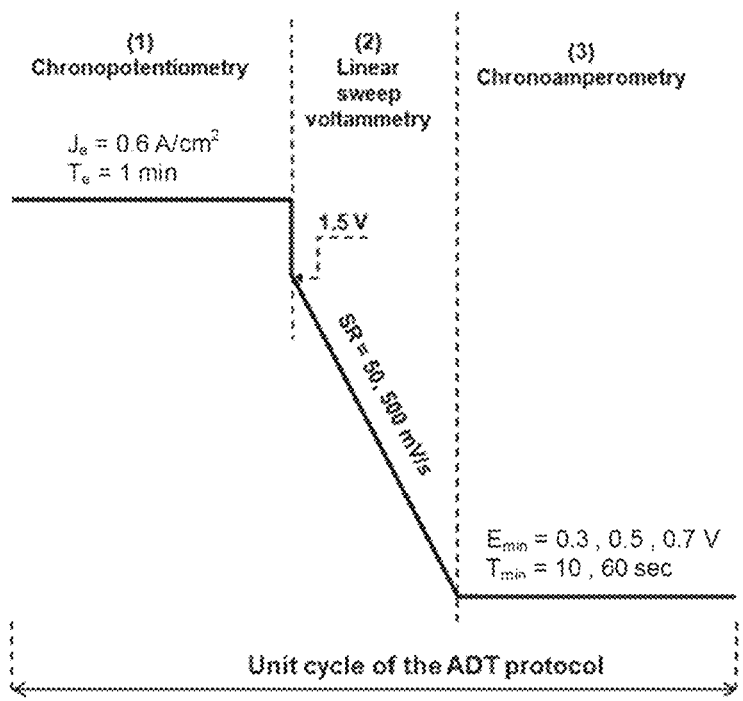
[FIG.2]
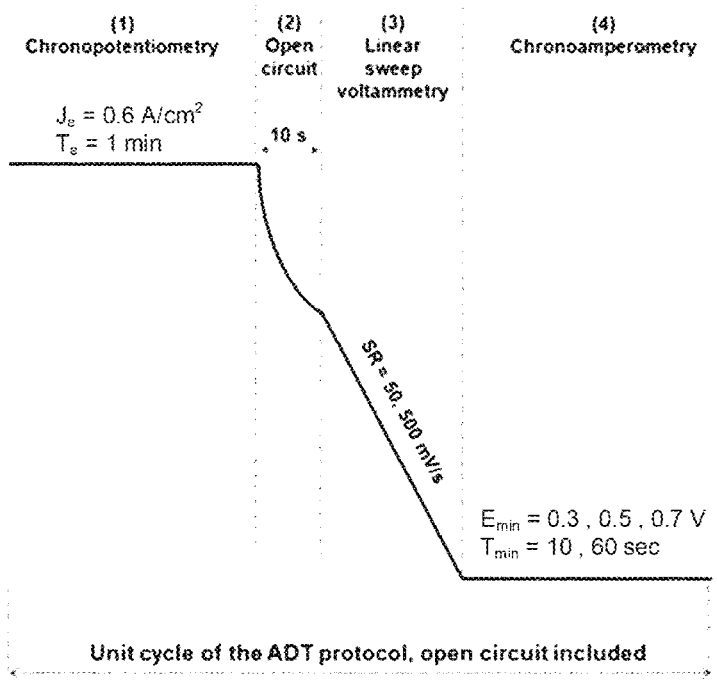

[FIG.3]
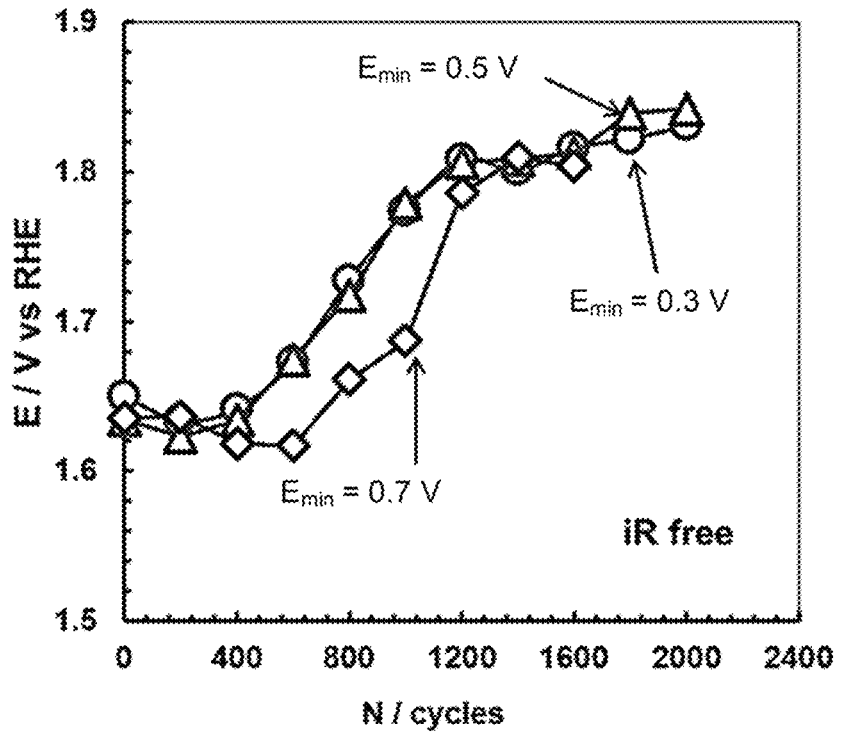
[FIG.4(a)]
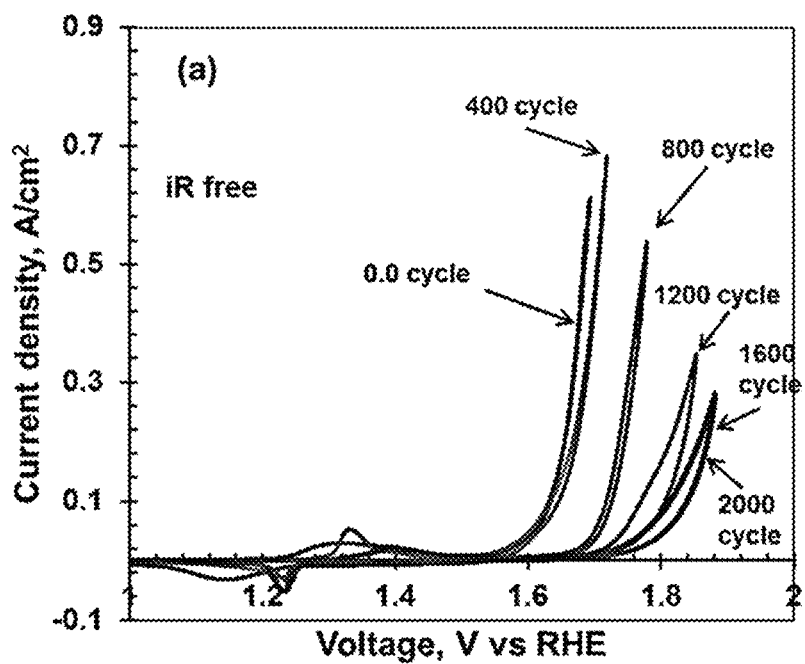

[FIG.4(b)]
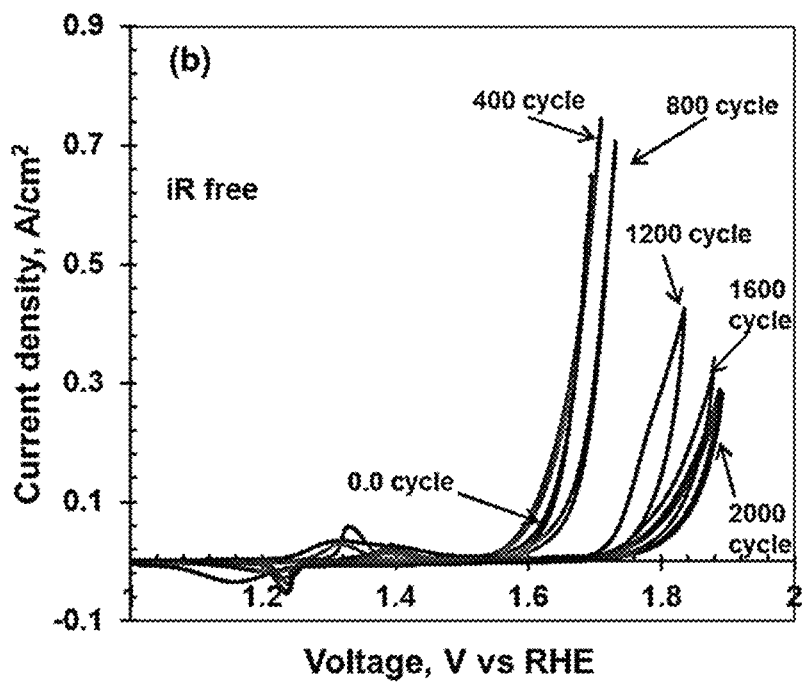
[FIG.5]
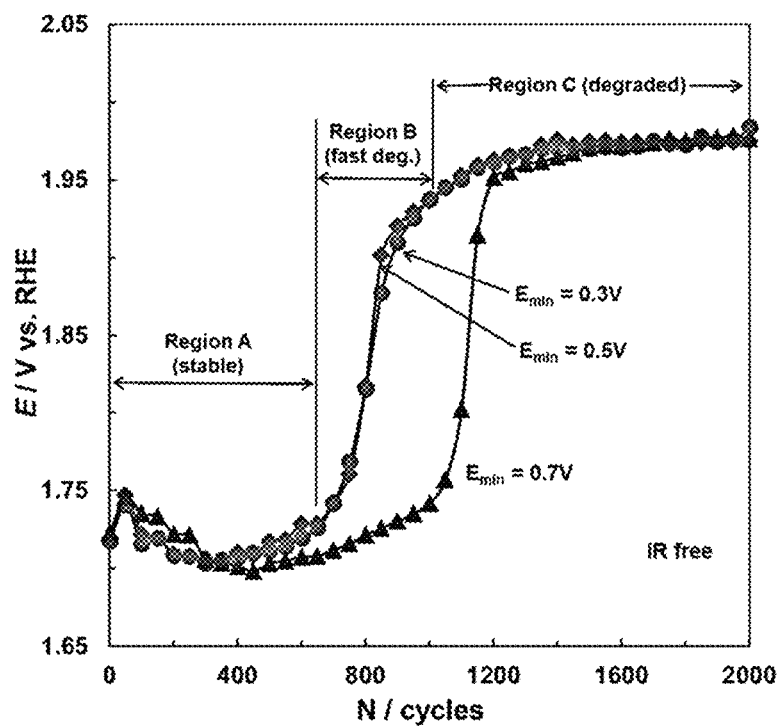

[FIG.6]
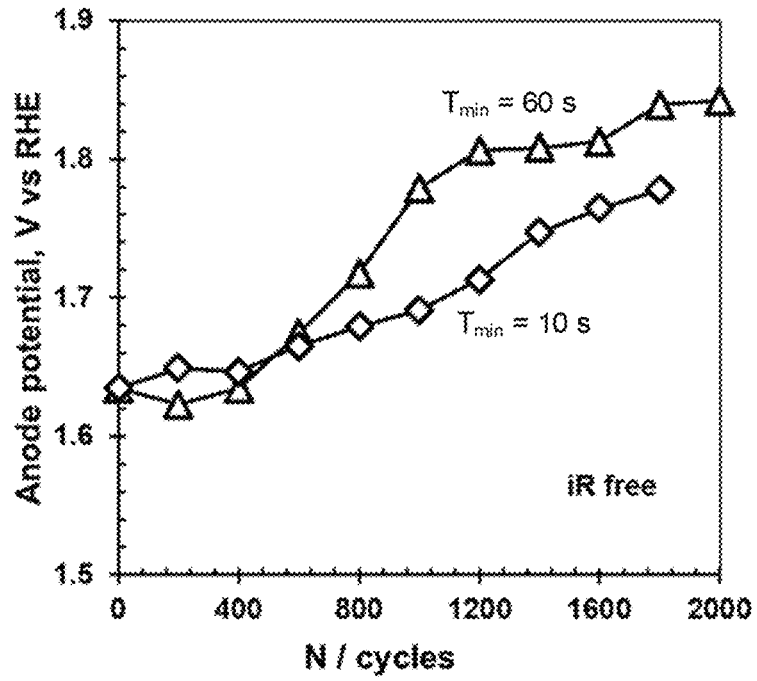
[FIG.7]
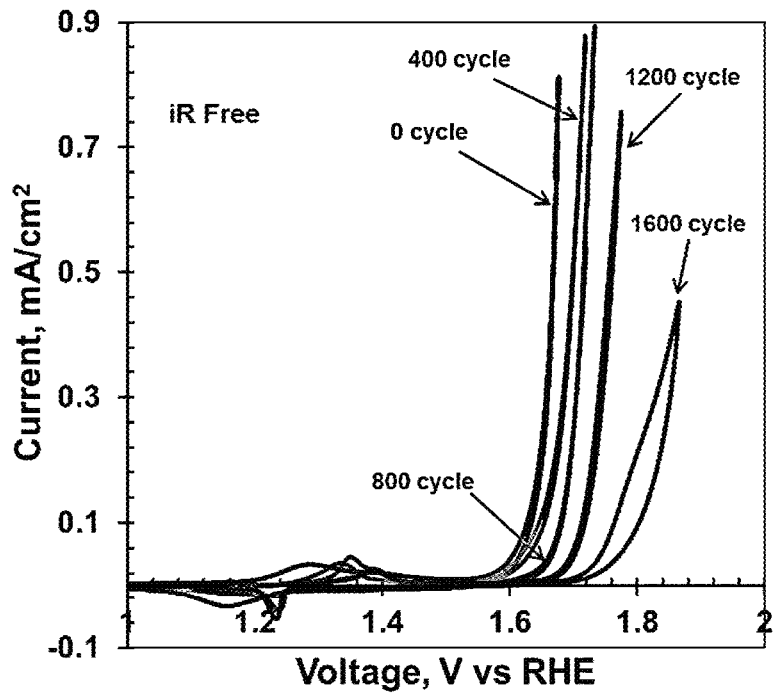

[FIG.8]
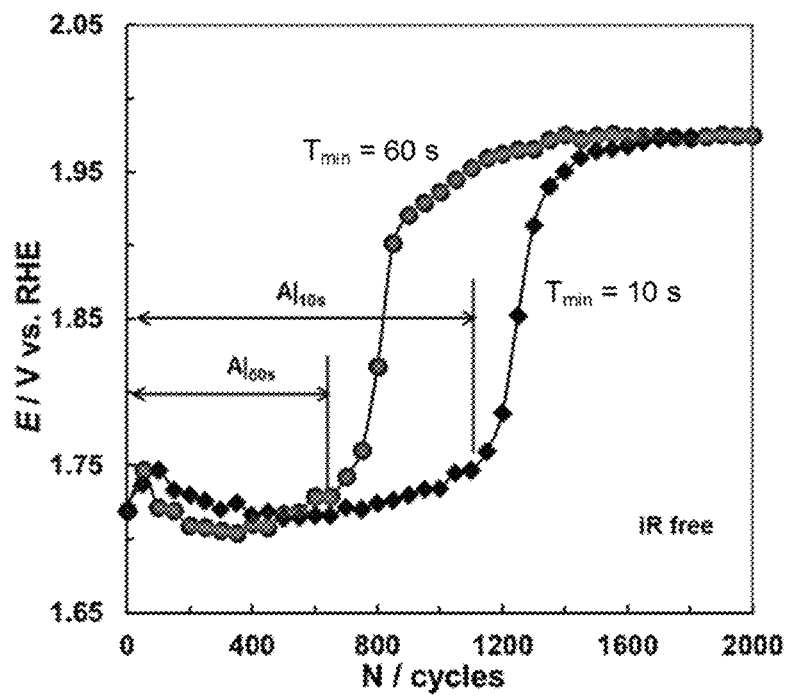
[FIG.9]
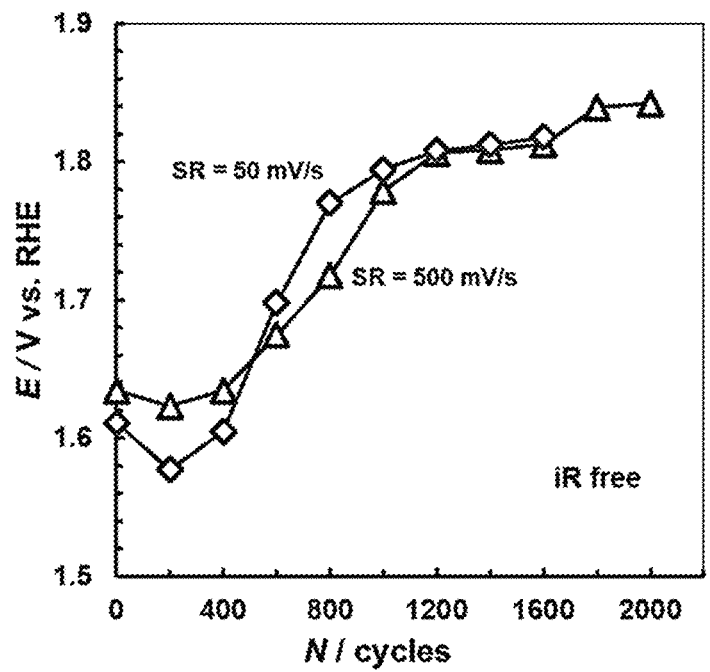

[FIG.10]
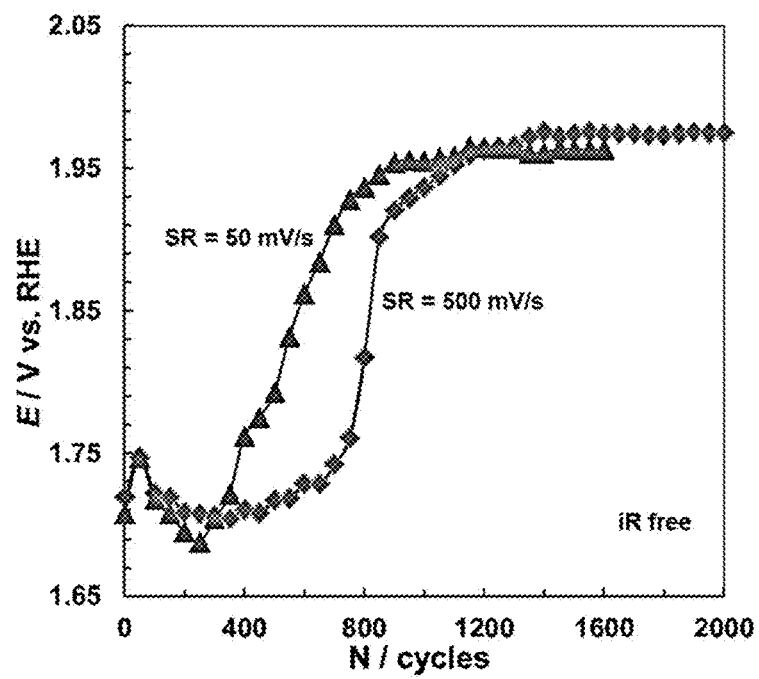
[FIG.11]
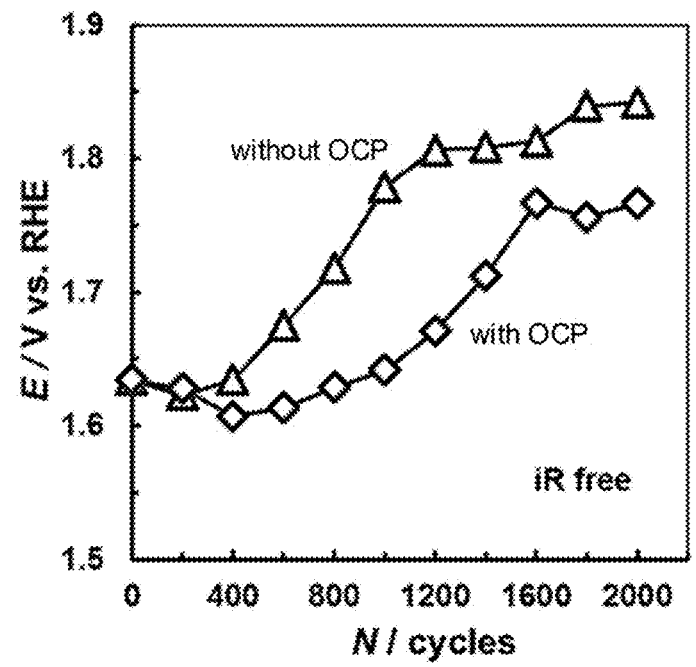

[FIG.12]
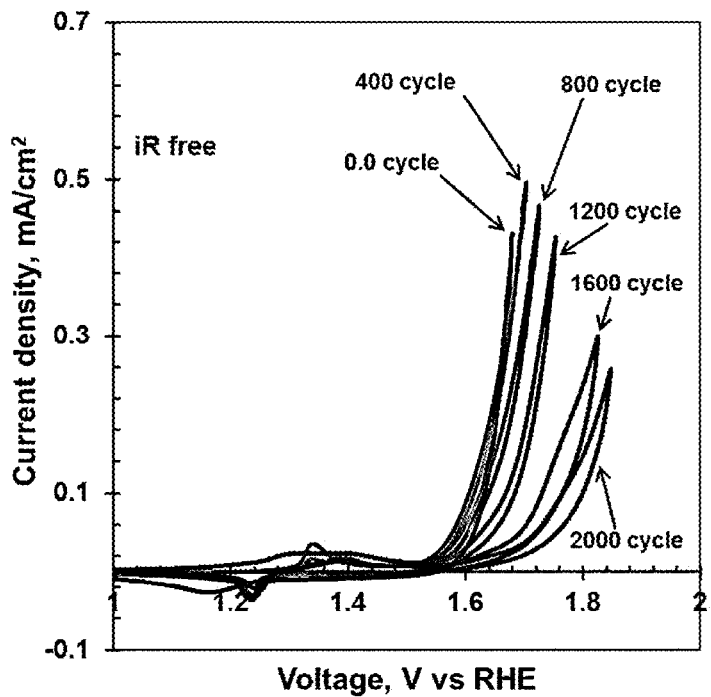
[FIG.13]
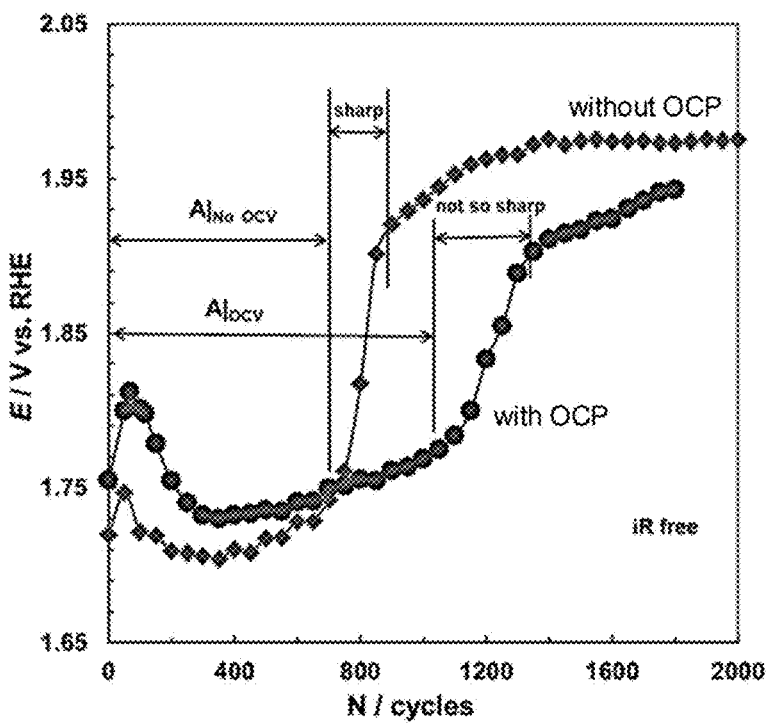

ACCELERATED EVALUATION METHOD FOR ANODE

TECHNICAL FIELD

The present invention relates to an accelerated evaluation method for an anode to be used in, for example, water electrolysis.

BACKGROUND ART

Hydrogen is secondary energy which is suitable for storage and transportation and has small environmental load, and therefore a hydrogen energy system using hydrogen as an energy carrier has been attracting attention. Currently, hydrogen is mainly produced by steam reforming of fossil fuel, or the like. However, from the viewpoint of problems of global warming and exhaustion of fossil fuel, hydrogen production by water electrolysis using renewable energy, such as solar power generation and wind power generation, is important in generic technology. Water electrolysis is low cost, suitable for enlargement of scale, and therefore is a predominant technique for hydrogen production.

Current practical water electrolysis is largely divided into two. One is alkaline water electrolysis, in which a high-concentration alkali aqueous solution is used for an electrolyte. The other is solid polymer electrolyte water electrolysis, in which a solid polymer electrolyte (SPE) membrane is used for an electrolyte. When large-scale hydrogen production is performed by water electrolysis, it is said that alkaline water electrolysis, in which an inexpensive material, such as an iron group metal including nickel and the like, is used, is more suitable than solid polymer electrolyte water electrolysis, in which an electrode using a large amount of an expensive noble metal is used. Recently, development of water electrolysis using an anion exchange membrane has also progressed. An electrode material which is the same one as used in alkaline water electrolysis can also be used in water electrolysis using an anion exchange membrane.

With respect to the high-concentration alkali aqueous solution, electric conductivity becomes high as the temperature increases, but corrosiveness also becomes high. Therefore, the upper limit of the operation temperature is controlled to about 80 to about 90° C. The electrolysis performance has been improved to about 1.7 to about 1.9 V (78 to 87% in terms of efficiency) at a current density of 0.3 to 0.4 $A \cdot cm^{-2}$ by the development of constitutional materials and various piping materials for an electrolytic cell, which are high-temperature resistant and resistant to a high-concentration alkali aqueous solution, and the development of a low-resistivity separator and an electrode which has an enlarged surface area and has a catalyst applied thereon.

A nickel-based material which is stable in a high-concentration alkali aqueous solution is used as an alkaline water electrolysis anode, and it has been known that in the case of alkaline water electrolysis using a stable power source, a nickel-based anode has a life of several decades or longer. However, when renewable energy is used as a power source, severe conditions, such as sudden start/shutdown and abrupt load fluctuation, are frequent, and therefore degradation in performance of the nickel-based anode has been problematic.

Both of the reaction of producing a nickel oxide and the reaction of reducing the produced nickel oxide progress on the surface of a nickel-based material. Therefore, elimination of an electrode catalyst formed on the surface of the nickel-based material is facilitated with the progress of these reactions. When the electric power for electrolysis is not supplied, the electrolysis stops, and the nickel-based anode is retained at a potential lower than the oxygen evolution potential (1.23 V vs. RHE) and higher than the potential of a hydrogen evolution cathode, which is a counter electrode, (0.00 V vs. RHE). In the electrolytic cell, electromotive force due to various chemical species is generated, so that the anode potential is retained low, and the reaction of reducing the nickel oxide is facilitated by the progress of a battery reaction.

A current generated by the battery reaction leaks through a manifold in the case of, for example, an electrolytic stack obtained by combining a plurality of cells, such as an anode chamber and a cathode chamber. Examples of the countermeasure for preventing such leakage of a current include a method of allowing a minute current to flow continuously during shutdown. However, to allow a minute current to flow continuously during shutdown, special power source control is needed, and oxygen and hydrogen are evolved at all times, and therefore there is a problem that excessive labor has to be done in terms of operation management. In addition, preventing a battery reaction by removing liquid immediately after shutdown for the purpose of intentionally avoiding a reverse current state is possible, but it cannot be said that such measure is always an adequate approach when operation with electric power having a large output fluctuation, such as renewable energy, is supposed.

In the past, platinum group metals, platinum group metal oxides, valve metal oxides, iron group oxides, lanthanide group metal oxides, and the like have been utilized as a catalyst for an oxygen evolution anode (anode catalyst) which is used for alkaline water electrolysis. As other anode catalysts, alloy-based anode catalysts using nickel as a base, such as Ni—Co and Ni—Fe; nickel having an enlarged surface area; electrically conductive oxides (ceramic materials) including spinel-based anode catalysts, such as $Co_3O_4$ and $NiCo_2O_4$, and perovskite-based anode catalysts, such as $LaCoO_3$ and $LaNiO_3$; noble metal oxides; oxides containing a lanthanide group metal and a noble metal; and the like have also been known.

As an oxygen evolution anode which is used for high-concentration alkaline water electrolysis, an anode obtained by forming a lithium-containing nickel oxide layer on the surface of a nickel substrate in advance is known (Patent Literatures 1 and 2). Further, an alkaline water electrolysis anode obtained by forming a lithium-containing nickel oxide catalyst layer containing lithium and nickel in a predetermined molar ratio on the surface of a nickel substrate (Patent Literature 3) and an alkaline water electrolysis anode obtained by forming a catalyst layer containing a nickel-cobalt-based oxide, and an iridium oxide or a ruthenium oxide on the surface of a nickel substrate (Patent Literature 4) have been proposed. However, when electric power having a large output fluctuation, such as renewable energy, is used as a power source, even the performance of the anodes proposed in Patent Literatures 1 to 4 is likely to be lowered and it has been difficult to use the anodes stably over a long period of time. Therefore, there is a need to develop an anode that can be used stably over a longer period of time even when electric power having a large output fluctuation is used as a power source.

Note that the service life of an electrode is 5 to 10 years, and therefore it has substantially been impossible to spend such a long time on the development and evaluation of an anode. Therefore, a method for evaluating an anode and an anode catalyst in an accelerated manner by simulating actual electrolysis conditions in alkaline water electrolysis and the like and reproducing actual degradation in a shorter time is very important for the development and quality control of an anode and an anode catalyst.

So far, a method in which cyclic voltammetry and cyclic galvanometry are continuously used multiple times (Non Patent Literatures 1 and 2), a method in which the durability of an anode catalyst is investigated by a fluctuating current such as a sine wave (Non Patent Literature 3), and the like have been adopted in order to evaluate the durability of an anode catalyst. In addition, a test method in which appropriate potentials are repeatedly swept in order to select a non-noble metal catalyst has been proposed (Patent Literature 5). Further, an accelerated test in which an extremely large current is allowed to flow for a long period of time has been proposed (Patent Literature 6).

On the other hand, there have been reported that an electrochemical reduction reaction of an anode occurs at the surface of the anode when the potential becomes lower than the open circuit potential after the completion of an electrolysis reaction of water and that the dissolution and exfoliation of a catalyst are accelerated by transitions repeated between a reduction condition and an oxidation condition (Non Patent Literatures 4 and 5).

CITATION LIST

Patent Literature

Patent Literature 1: GB 864457
Patent Literature 2: U.S. Pat. No. 2,928,783
Patent Literature 3: Japanese Patent Laid-Open No. 2015-86420
Patent Literature 4: Japanese Patent Laid-Open No. 2017-190476
Patent Literature 5: U.S. Patent Application Publication No. 2016/199821
Patent Literature 6: U.S. Pat. No. 4,498,962

Non Patent Literature

Non Patent Literature 1: D. Delgado, F. Bizzotto, A. Zana, and M. Arenz, Chem. Phys. Chem., 2, 3147-3153(2019)
Non Patent Literature 2: Tsukada, Yudai; Kuroda, Yoshiyuki; Niiro, Hideaki; Fujii, Yuichi; Fujimoto, Norikazu; Mitsushima, Shigenori; Electrochimica Acta (20200901), 353, pp. 136544
Non Patent Literature 3: Z. Dobo and A. B. Palotas, Int. J. Hydrogen Energy, 42, 5649-5656(2017)
Non Patent Literature 4: M. Bernt et al., Chemie Ing. Tech., 92, 31-39(2020)
Non Patent Literature 5: A. Weis et al., J. Electrochem. Soc., 166, F487-F497(2019)

SUMMARY OF INVENTION

Technical Problem

However, all of the evaluation methods in the past have been insufficient as a method for evaluating, in an accelerated manner, the durability of an anode using electric power having a large output fluctuation, such as renewable energy, as a power source. That is, a current situation is that a practical method imitating an intermittent property having a large fluctuation, such as renewable energy, and evaluating, in an accelerated manner, the life of an anode for water electrolysis or the like has not been found so far.

The present invention has been completed in view of such problems of the conventional techniques, and an object of the present invention is to provide an accelerated evaluation method for an anode, the method imitating electric power having a large output fluctuation, such as renewable energy, and enabling accurate evaluation, in a shorter time, of the durability of an anode using such electric power having a large output fluctuation as a power source.

Solution to Problem

The present inventors have conducted diligent studies in order to solve the problems and have found that the problems can be solved by repeating multiple times a step of loading a current having a constant density to an anode and a step of holding the anode at a constant potential, and thereby completed the present invention.

That is, the present invention provides an accelerated evaluation method for an anode, described below.

[1] An accelerated evaluation method for an anode, the method performing evaluation of durability of the anode in an accelerated manner by electrochemical operation in an aqueous electrolyte, and comprising: a $J_e$ step of loading an oxidation current of 0.1 A/cm$^2$ or more to the anode for a duration of $T_e$; and an $E_{min}$ step of holding the anode at a constant potential lower than an open circuit potential for a duration of $T_{min}$, wherein each of the $J_e$ step and the $E_{min}$ step is repeated 100 times or more.

[2] The accelerated evaluation method for an anode according to [1], wherein each of the duration $T_e$ and the duration $T_{min}$ is 120 s or shorter.

[3] The accelerated evaluation method for an anode according to [1] or [2], further comprising an LSV step of subjecting the anode, between the $J_e$ step and the $E_{min}$ step, to linear sweep voltammetry that starts from a potential lower than a potential at a time when the $J_e$ step is completed, wherein a range of a scan rate SR in the linear sweep voltammetry is 50 to 500 mV/s.

[4] The accelerated evaluation method for an anode according to [3], further comprising an OCP step of holding the anode at an open circuit potential between the $J_e$ step and the LSV step, wherein a retention time for holding the anode at the open circuit potential is 10 to 60 s.

[5] The accelerated evaluation method for an anode according to any one of [1] to [4], wherein the anode is held at a potential 0.6 to 1.0 V lower than the open circuit potential in the $E_{min}$ step.

[6] The accelerated evaluation method for an anode according to any one of [1] to [5], wherein the anode is an oxygen evolution electrode.

Advantageous Effects of Invention

The present invention can provide an accelerated evaluation method for an anode, the method imitating electric power having a large output fluctuation, such as renewable energy, and enabling accurate evaluation, in a shorter time, of the durability of an anode using such electric power having a large output fluctuation as a power source.

BRIEF DESCRIPTION OF DRAWINGS

FIG. 1 is a graph showing one embodiment of an accelerated evaluation method for an anode of the present invention.

FIG. 2 is a graph showing another embodiment of an accelerated evaluation method for an anode of the present invention.

FIG. 3 is a graph obtained by plotting electrode potentials at an oxidation current of 0.1 A/cm² versus the number of cycles in Example 1.

FIG. 4(a) is a graph showing polarization curves at a holding potential of 0.5 V vs. RHE in Example 1.

FIG. 4(b) is a graph showing polarization curves at a holding potential of 0.7 V vs. RHE in Example 1.

FIG. 5 is a graph obtained by plotting electrode potentials at an oxidation current of 0.1 A/cm² versus the number of cycles in Example 1.

FIG. 6 is a graph obtained by plotting electrode potentials at an oxidation current of 0.1 A/cm² versus the number of cycles in Example 2.

FIG. 7 is a graph showing polarization curves at a duration $T_{min}$ of 10 s and 60 s in Example 2.

FIG. 8 is a graph obtained by plotting electrode potentials at an oxidation current of 0.1 A/cm² versus the number of cycles in Example 2.

FIG. 9 is a graph obtained by plotting electrode potentials at an oxidation current of 0.1 A/cm² versus the number of cycles in Example 3.

FIG. 10 is a graph obtained by plotting electrode potentials at an oxidation current of 0.1 A/cm² versus the number of cycles in Example 3.

FIG. 11 is a graph obtained by plotting electrode potentials at an oxidation current of 0.1 A/cm² versus the number of cycles in Example 4.

FIG. 12 is a graph showing polarization curves at a duration $T_{min}$ of 10 s and 60 s in Example 4.

FIG. 13 is a graph obtained by plotting electrode potentials at an oxidation current of 0.1 A/cm² versus the number of cycles in Example 4.

DESCRIPTION OF EMBODIMENTS

The accelerated evaluation method for an anode of the present invention (hereinafter, also simply referred to as "evaluation method") is a method for evaluating, in an accelerated manner, the durability of an anode, such as, for example, an alkaline water electrolysis anode (oxygen evolution anode), by an electrochemical operation in an aqueous electrolyte and includes a $J_e$ step of loading an oxidation current of 0.1 A/cm² or more to the anode for a duration of $T_e$, and an $E_{min}$ step of holding the anode at a constant potential lower than an open circuit potential for a duration of $T_{min}$. Then, each of the $J_e$ step and the $E_{min}$ step is repeated 100 times or more. Hereinafter, details on the evaluation method of the present invention will be described.

The evaluation method of the present invention is a method for evaluating the durability of an anode using electric power whose output fluctuates in a complex manner, such as renewable energy, in an accelerated manner and mainly includes an operation in a steady state under an oxidation current and control of a low potential reached when electric power is not supplied. FIG. 1 is a graph showing one embodiment of the accelerated evaluation method for an anode of the present invention. In the evaluation method of the embodiment shown in FIG. 1, the $J_e$ step of loading an oxidation current of 0.6 A/cm² for water electrolysis to an anode is performed for a duration of $T_e$ in an alkali aqueous solution at room temperature to 100° C. during the evaluation cycles, and then the $E_{min}$ step of holding the anode at a constant potential lower than the open circuit potential is performed for a duration of $T_{min}$. Then, each of these $J_e$ step and $E_{min}$ step is repeated 100 times or more.

Each of the duration $T_e$ and the duration $T_{min}$ is preferably set to 120 s (2 min) or shorter, more preferably 90 s or shorter, particularly preferably 60 s or shorter, and most preferably 45 s or shorter. When each of the duration $T_e$ and the duration $T_{min}$ is longer than 120 s (seconds), the time required for the evaluation is excessively long, and even if each of the duration $T_e$ and the duration $T_{min}$ is made longer than 120 s, an increase in the degradation rate of an anode is not expected. In the $E_{min}$ step, an anode is preferably held at a potential 0.6 to 1.0 V lower than the open circuit potential. When an anode is held at a potential higher than this range, the degradation rate is likely to decrease. On the other hand, when an anode is held at a potential lower than the above-described range, excessive reduction of a catalyst may be induced or hydrogen may be evolved. Therefore, the degradation behavior may be somewhat different from the degradation behavior in actual operation in some cases.

As shown in FIG. 1, the accelerated evaluation method for an anode of the present invention preferably further includes an LSV step of performing, between the $J_e$ step and the $E_{min}$ step, linear sweep voltammetry (LSV) that starts from a potential lower than a potential at the time when the $J_e$ step is completed. Thereby, the actual fluctuation states of electric power having a large output fluctuation, such as renewable energy, can be simulated more suitably. Note that the LSV is usually started from a potential ("1.5 V" in FIG. 1) near the open circuit potential. The range of the scan rate SR in the LSV is preferably set to 50 to 500 mV/s. When the scan rate SR is excessively slow, degradation is accelerated, but the time required for the whole evaluation method may be long in some cases and electric power fluctuation that is actually unlikely to occur may is likely to occur. On the other hand, when the scan rate SR is excessively fast, the significance of providing the LSV step may be lost in some cases.

FIG. 2 is a graph showing another embodiment of the accelerated evaluation method for an anode of the present invention. As shown in FIG. 2, the accelerated evaluation method for an anode of the present invention preferably further includes an OCP step of holding the anode at the open circuit potential between the $J_e$ step and the LSV step. By further providing the OCP step, the actual fluctuation states of electric power having a large output fluctuation, such as renewable energy, can be simulated more suitably. In the OCP step, the holding time for holding the anode at the open circuit potential is preferably set to 10 to 60 s. When the holding time is excessively short, it may be difficult to obtain the effect of retaining the anode at the open circuit potential in some cases. On the other hand, when the holding time is excessively long, the significance of providing the OCP step may be lost in some cases.

The number of repetition (number of cycles) of each of the $J_e$ step and the $E_{min}$ step depends on the type of the anode to be an object of the evaluation, or the like, and is 100 or more, preferably 10,000 or less. Further, the time required for each step is preferably set such that the overall time required for the evaluation is about several hours to about several hundred hours.

(Anode)

Next, the anode to be an object of the evaluation will be described taking an alkaline water electrolysis anode for example. The alkaline water electrolysis anode (hereinafter, also simply referred to as "anode") is provided with, for example, an electrically conductive substrate, an intermediate layer arbitrarily formed on the surface of the electrically conductive substrate, and a catalyst layer formed on the surface of the intermediate layer.

The electrically conductive substrate is an electric conductor that conducts electricity for electrolysis and is an element having a function as a carrier that carries the intermediate layer and the catalyst layer. At least a surface of the electrically conductive substrate (the surface on which the intermediate layer and the catalyst layer are formed) is formed with nickel or a nickel base alloy. That is, the whole of the electrically conductive substrate may be formed with nickel or a nickel base alloy, or only the surface of the electrically conductive substrate may be formed with nickel or a nickel base alloy. Specifically, the electrically conductive substrate may be such that a coating of nickel or a nickel base alloy is formed on the surface of a metal material, such as iron, stainless steel, aluminum, or titanium, by plating or the like.

The thickness of the electrically conductive substrate is preferably 0.05 to 5 mm. The shape of the electrically conductive substrate is preferably a shape having an opening for removing bubbles of oxygen, hydrogen, and the like to be produced. For example, an expanded mesh or a porous expanded mesh can be used as the electrically conductive substrate. When the electrically conductive substrate has a shape having an opening, the aperture ratio of the electrically conductive substrate is preferably 10 to 95%.

The catalyst layer is a layer that is formed on the surface of the electrically conductive substrate or the surface of the intermediate layer and has catalytic ability. By interposing the intermediate layer, the catalyst layer is more firmly fixed on the electrically conductive substrate. The type of the catalyst contained in the catalyst layer is not particularly limited, and a catalyst having catalytic ability according to the purpose can be selected for use. Specific examples of the catalyst include nickel cobalt spinel oxide ($NiCo_2O_4$), a lanthanoid nickel cobalt perovskite oxide, an iridium oxide, a ruthenium oxide, and a lithium nickel cobalt perovskite oxide. The lanthanoid nickel cobalt perovskite oxide is represented by structural formula: $XNi_aCo_{1-a}O_3$ wherein X represents at least any one of metals of lanthanum, cerium, and praseodymium, and $0<a<1$.

The catalyst layer may be formed with a single catalyst or may be formed with a plurality of catalysts. When a plurality of catalysts is used, a catalyst layer of a single layer can be formed by mixing a plurality of the catalysts. In addition, a catalyst layer of a stacked type may be prepared by stacking a plurality of catalyst layers. When the catalyst layer of a stacked type is prepared, each layer may be formed with a single catalyst, or each layer may be formed with a plurality of catalysts. For example, after a first layer composed of a lithium nickel oxide or nickel cobalt spinel oxide is formed on the intermediate layer, a second layer composed of an iridium oxide may be stacked on the first layer. The thickness, density, and the like of the catalyst layer are not particularly limited and may appropriately be set according to the use application of the anode, or the like.

The anode can be produced by forming an intermediate layer as necessary on the surface of the electrically conductive substrate and then forming a catalyst layer. The catalyst layer can be formed by, for example, a thermal decomposition method, electroplating, sputtering, ion plating, plasma spraying, or the like. Hereinafter, the method for producing an anode will be described taking for example a method for forming a catalyst layer by a thermal decomposition method.

The electrically conductive substrate is preferably subjected to a chemical etching treatment in advance for the purpose of removing contamination particles of a metal, an organic substance, and the like on the surface before forming the catalyst layer. The consumption of the electrically conductive substrate by the chemical etching treatment is preferably set to about 30 $g/m^2$ or more and about 400 $g/m^2$ or less. In addition, the surface of the electrically conductive substrate is preferably subjected to a roughening treatment in advance for the purpose of enhancing the adhesiveness with the intermediate layer and the catalyst layer. Examples of the means for the roughening treatment include a blast treatment in which a powder is sprayed, an etching treatment using an acid that can dissolve the substrate, and plasma spraying.

An aqueous solution of a precursor containing a desired metal ion is coated on the surface of the electrically conductive substrate on which a chemical etching treatment has been performed. Examples of the coating method include brash coating, roller coating, spin coating, and electrostatic coating. Subsequently, the electrically conductive substrate coated with the aqueous solution is dried as necessary. The drying temperature is preferably set to a temperature to avoid rapid evaporation of the solvent (for example, about 60 to about 80° C.)

Subsequently, the electrically conductive substrate whose surface has been coated with the aqueous solution of the precursor is subjected to a thermal treatment. Thereby, the catalyst layer can be formed on the surface of the electrically conductive substrate. The thermal treatment temperature can appropriately be set. When the decomposition temperature of the precursor and the production costs are taken into consideration, the thermal treatment temperature is preferably set to 450 to 600° C., more preferably 450 to 550° C. For example, the decomposition temperature of lithium nitrate is about 430° C., and the decomposition temperature of nickel acetate is about 373° C. When the thermal treatment temperature is set to 450° C. or higher, thereby each component can more surely be decomposed. When the thermal treatment temperature is set in such a way as to exceed 600° C., the oxidation of the electrically conductive substrate easily progresses, and the electrode resistance increases to bring about an increase in the voltage loss in some cases. The thermal treatment time may appropriately be set taking the reaction rate, the productivity, the oxidation resistance at the surface of the catalyst layer, and the like into consideration.

By appropriately setting the number of times of coating of the above-described aqueous solution of the precursor, the thickness of the catalyst layer to be formed can be controlled. Note that the coating and drying of the aqueous solution may be repeated for every layer until the uppermost layer is formed, and thereafter the thermal treatment may be performed on the whole layers, or the coating of the aqueous solution and the thermal treatment (pre-treatment) may be repeated for every layer until the uppermost layer is formed, and thereafter the thermal treatment may be performed on the whole layers. The temperature of the pre-treatment and the temperature of the thermal treatment on the whole layers may be the same or different. In addition, the time for the pre-treatment is preferably made shorter than the time for the thermal treatment on the whole layers.

EXAMPLES

Hereinafter, the present invention will specifically be described based on Examples, but the present invention is not limited to those Examples. In the following Examples, electrochemical cells (volume: 5 L) made of polytetrafluoroethylene (PTFE) were used. Each of these electrochemical cells is a three-electrode cell using an object to be evaluated (anode) as a working electrode, RHE as a reference electrode, and spiral nickel wire as a counter electrode. The working electrode had a surface area of 1.0 cm² and was connected to Ni wire shielded with a heat-shrinkable tube. The distance between the Luggin capillaries of the working electrode and the reference electrode was fixed within about 1 cm. The counter electrode was installed in a cylindrical neutral separator in order to prevent diffusion of hydrogen to be mainly produced into the electrolyte in the cell. A 7.0 mol/L KOH aqueous solution was used as the electrolyte. The temperature of the electrolyte was retained at 80° C. and 25° C. during the pre-treatment (electrochemical activation) and the accelerated evaluation, respectively. A Bio-Logic SAS potentiostat (model: VSP-300) controlled by dedicated software (EC-Lab V11.30) was used for the electrochemical operation. As the electrochemical pre-treatment, water electrolysis was performed using the anode to be an object of the evaluation at a constant current of 1.0 A/cm² at 80° C. for 2 hours.

(Production of Alkaline Water Electrolysis Anode)

Nickel nitrate and cobalt nitrate were dissolved in pure water to obtain a coating solution in which the molar ratio of nickel (Ni): cobalt (Co) was Ni:Co=33.3:66.7. The obtained coating solution was coated on the surface of a surface-treated nickel substrate in such a way that the amount of the metals per coating was 1 g/m², and then dried at room temperature for 10 minutes and at 60° C. for 10 minutes. Subsequently, a thermal treatment was performed at 350° C. for 15 minutes in an air-circulating electric furnace for thermal decomposition. The treatments from the coating of the coating solution and the thermal decomposition were repeated 4 times to obtain alkaline water electrolysis anode (n=1 and 2) having a catalyst layer (composition: $NiCo_2O_4$) formed on the surface of the nickel substrate. The amount of the metals in the formed catalyst layer was 4 g/m².

Example 1

Influence of $E_{min}$ Step:

As shown in FIG. 1, an LSV step of holding the potential at the time when the $J_e$ step was completed at 1.5 V vs. RHE, and performing the LSV at a scan rate SR of 500 mV/s from the potential was provided between the $J_e$ step and the $E_{min}$ step in order to simulate the actual fluctuation of electric power, such as renewable energy. The LSV step was performed setting $E_{min}$=0.3, 0.5, and 0.7 V versus RHE and setting the duration $T_{min}$ in this step to 60 s. FIG. 3 shows a graph obtained by plotting electrode potentials at an oxidation current of 0.1 A/cm² versus the number of cycles. The values of the electrode potentials in FIG. 3 were calculated from the polarization curves (sweep rate: 5 mV/s) shown in FIG. 4(a) and Figure 4(b).

As shown in FIG. 3, changes (degradation) in electrode potential were almost the same at $E_{min}$=0.3 V and 0.5V. In contrast, degradation was slow at $E_{min}$=0.7 V, and it is understood that the stress to the anode was reduced more when the value of $E_{min}$ was higher. As shown in FIG. 5, the degradation behavior of the anode can be divided, based on the anode potential in the $J_e$ step, into three main regions of region A where the electrode exhibits stable catalytic performance, region B where the electrode is rapidly degraded, and region C where the lowered performance of the catalyst became equal to the performance of the nickel substrate.

Note that the surface observation by SEM demonstrated exhaustion of the catalyst in the anode which reached region C.

Example 2

Influence of Duration $T_{min}$ in $E_{min}$ Step:

As shown in FIG. 1, the evaluation was performed fixing the holding potential ($E_{min}$) in the $E_{min}$ step to 0.5 V and changing only the duration $T_{min}$. FIG. 6 shows a graph obtained by plotting electrode potentials at an oxidation current o 0.1 A/cm² versus the number of cycles. The values of the electrode potentials in FIG. 6 were calculated from the polarization curves (sweep rate: 5 mV/s) shown in FIG. 7.

As shown in FIG. 7, it was observed that degradation progressed faster in the case where the duration $T_{min}$ was 60 s than in the case where the duration $T_{min}$ was 10 s. FIG. 8 shows that when the duration $T_{min}$ was 10 s, region A was made significantly wider and stable activity was retained over the larger number of cycles. It is inferred that when the potential becomes lower than the open circuit potential after the water electrolysis reaction is completed, an electrochemical reduction reaction progresses on the surface of the anode, which causes a degradation reaction, such as dissolution and elimination, of an electrode catalyst. It is understood that this degradation reaction strongly depends not only on the holding potential in the $E_{min}$ step but the duration $T_{min}$.

Example 3

Influence of Scan Rate in LSV Step:

As shown in FIG. 1, the evaluation was performed fixing the holding potential ($E_{min}$) in the $E_{min}$ step to 0.5 V and the duration $T_{min}$ rain to 60 s and changing only the scan rate SR in the LSV step. FIGS. 9 and 10 each show a graph obtained by plotting electrode potentials at an oxidation current o 0.1 A/cm² versus the number of cycles. Of the scan rates SRs of 50 mV/s and 500 mV/s, the electrode exhibited more favorable durability when the scan rate was 500 mV/s. Further, FIG. 10 shows that when the scan rate SR was 50 mV/s, region B appeared from a smaller number of cycles. As described above, it is clear that by decreasing the scan rate SR, the degradation reaction on the surface of the anode is accelerated.

From the results of Examples 1 and 2, the presence of a phenomenon that the degradation, such as dissolution and elimination, of the electrode catalyst is accelerated by the number of cycles in the $J_e$ step and the $E_{min}$ step was found. Further, from the results of Example 3, the presence of a phenomenon that the degradation reaction of the electrode catalyst easily progresses to significantly lower the durability by decreasing the scan rate SR in the LSV step was able to be found. That is, it was ascertained that the scan rate SR in the LSV step is an effective factor of the accelerated evaluation.

Example 4

Influence of OCP Step:

As shown in FIG. 2, the evaluation was performed further providing the OCP step of holding the anode at the open circuit potential between the $J_e$ step and the LSV step. Note that the evaluation was performed fixing the holding potential in the $E_{min}$ step to 0.5 V and the duration $T_{min}$ to 60 s and changing only the holding time in the OCP step in a range of 10 to 60 s. FIG. 11 shows a graph obtained by plotting electrode potentials at an oxidation current of 0.1 A/cm² versus the number of cycles. The values of the electrode potentials in FIG. 11 were calculated from the polarization curves (sweep rate: 5 mV/s) shown in FIG. 12.

FIG. 11 shows that the interval in the OCP step gives a significant influence on an improvement in the durability of the anode. Further, FIG. 13 shows that the range where the anode exhibits stable catalytic activity (region A) was clearly extended and the rate of progress in the subsequent region (region B) was remarkably lowered due to the presence of the OCP step. In Example 4, a phenomenon that the durability of the electrode catalyst is significantly improved by providing the OCP step was found. The reason is not necessarily clear, but it is inferred that by holding the anode at the open circuit potential, the structural change of the catalyst layer that had occurred in the $J_e$ step was relaxed and recovered and the progress of the degradation in the $E_{min}$ step that followed was suppressed. This phenomenon may occur in an actual machine, and therefore an accelerated evaluation method for durability that corresponds better to an actual machine can be established by providing the OCP step.

INDUSTRIAL APPLICABILITY

The accelerated evaluation method for an anode of the present invention is useful as a method for evaluating, in an accelerated manner, an alkaline water electrolysis anode, such as, for example, an oxygen evolution electrode using electric power having a large output fluctuation, such as renewable energy, as a power source.

The invention claimed is:

1. An accelerated evaluation method for an anode, the method performing evaluation of durability of the anode in an accelerated manner by electrochemical operation in an aqueous electrolyte, and comprising:
   a $J_e$ step of loading an oxidation current of 0.1 A/cm² or more to the anode for a duration of $T_e$; and
   an $E_{min}$ step of holding the anode at a constant potential lower than an open circuit potential for a duration of $T_{min}$, wherein
   each of the $J_e$ step and the $E_{min}$ step is repeated 100 times or more.

2. The accelerated evaluation method for the anode according to claim 1, wherein each of the duration $T_e$ and the duration $T_{min}$ is 120 s or shorter.

3. The accelerated evaluation method for the anode according to claim 1, further comprising an LSV step of subjecting the anode, between the $J_e$ step and the $E_{min}$ step, to linear sweep voltammetry that starts from a potential lower than a potential at a time when the $J_e$ step is completed, wherein
   a range of a scan rate SR in the linear sweep voltammetry is 50 to 500 mV/s.

4. The accelerated evaluation method for the anode according to claim 3, further comprising an OCP step of holding the anode at the open circuit potential between the $J_e$ step and the LSV step, wherein
   a retention time for holding the anode at the open circuit potential is 10 to 60 s.

5. The accelerated evaluation method for the anode according to claim 1, wherein in the Emin step, the anode is held at the constant potential that is 0.6 to 1.0 V lower than the open circuit potential.

6. The accelerated evaluation method for the anode according to claim 1, wherein the anode is an oxygen evolution electrode.

* * * * *